(12) United States Patent
Yee et al.

(10) Patent No.: US 6,598,178 B1
(45) Date of Patent: Jul. 22, 2003

(54) PERIPHERAL BREAKPOINT SIGNALER

(75) Inventors: Oceager P. Yee, Allentown, PA (US); Zhigang Ma, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/322,920

(22) Filed: Jun. 1, 1999

(51) Int. Cl.[7] ............................................. G06F 11/30
(52) U.S. Cl. ........................................ 714/34; 714/44
(58) Field of Search ........................... 714/34, 44, 25, 714/32, 28; 703/28; 710/103

(56) References Cited

U.S. PATENT DOCUMENTS

| | | | | |
|---|---|---|---|---|
| 3,582,903 A | * | 6/1971 | Verdier | 710/31 |
| 3,921,141 A | * | 11/1975 | Wilber et al. | 714/25 |
| 4,468,753 A | * | 8/1984 | Berger | 710/305 |
| 4,675,646 A | * | 6/1987 | Lauer | 340/146.2 |
| 4,947,357 A | * | 8/1990 | Stewart et al. | 702/118 |
| 5,193,177 A | * | 3/1993 | Burri | 714/43 |
| 5,355,468 A | * | 10/1994 | Jeppesen et al. | 714/34 |
| 5,499,381 A | * | 3/1996 | Shibamiya | 710/100 |
| 5,631,912 A | * | 5/1997 | Mote, Jr. | 714/727 |
| 5,640,542 A | * | 6/1997 | Whitsel et al. | 703/28 |
| 5,704,034 A | * | 12/1997 | Circello | 714/34 |
| 5,790,833 A | * | 8/1998 | Gulick et al. | 703/28 |
| 5,867,507 A | * | 2/1999 | Beebe et al. | 714/726 |
| 5,925,115 A | * | 7/1999 | Ponte | 710/260 |
| 5,943,498 A | * | 8/1999 | Yano et al. | 717/4 |
| 6,158,023 A | * | 12/2000 | Ubukata et al. | 714/32 |

FOREIGN PATENT DOCUMENTS

| | | | | |
|---|---|---|---|---|
| JP | 361243539 A | * | 10/1986 | G06F/11/22 |
| JP | 63201861 A | * | 8/1988 | G06F/13/14 |

OTHER PUBLICATIONS

"JTAG (IEEE 1149.1/P1149.4) Tutorial Introductory", Sep. 10, 1997, Texas Instruments, <http://www.ti.com/sc/docs/jtag/seminar1.pdf> [Apr. 15, 2002].*

* cited by examiner

Primary Examiner—Robert Beausoliel
Assistant Examiner—Gabriel Chu
(74) Attorney, Agent, or Firm—William H. Bollman (57) ABSTRACT

The present invention provides an architecture for a peripheral device to activate a breakpoint in a processor or other device under emulation. A peripheral breakpoint active signaler allows the peripheral to signal the occurrence of a breakpoint to the processor using a halt or trap line to the processor. This invention provides developers with increased code development capabilities by allowing them to set breakpoints in a peripheral device for the benefit of a processor interfaced with the peripheral to detect when a certain external event has occurred based on the perspective of a peripheral. A breakpoint control register individually enables breakpointing capability of each peripheral with respect to having the capability to halt the processor. Each peripheral has the capability to output a breakpoint request signal to set a bit in a breakpoint status register for readback by the processor, through an external port such as a JTAG test port, or other device.

19 Claims, 5 Drawing Sheets

PERIPHERAL BREAKPOINT SIGNALER

BACKGROUND OF THE INVENTION

1. Field of the Invention

This invention relates generally to enhancing development capabilities for software developers. More particularly, it relates to an enhanced breakpointing technique wherein a processor device is halted in response to a breakpoint reached in a peripheral device.

2. Background of Related Art

In general, a digital system may contain one or more processor devices that control the operation of the digital system. In order to provide functionality to the digital system, computer programmers develop application programs, including operating systems, for execution in the processor device.

As the source program code is developed, errors or "bugs" are found and removed from the source program code. The task of finding these errors is called debugging.

Typically, during the debugging process, an engineer will develop program code by monitoring the functionality of the processor device being debugged as it proceeds through individual lines of the source program code. This technique is typically called tracing. Trace functions allow an engineer the ability to observe intermediate results within the processor device being debugged as individual or group of lines of the program code are executed. For instance while tracing, a status of selected registers and/or memory locations may be viewed before and/or after each instruction of the program code, or after a predetermined group of instructions of program code (e.g., a particular routine) is executed by the processing device. By reflecting the status of these registers and/or memory, the trace function provides the engineer with very detailed information about the internal state of a processor device as well as the value of data input or output therefrom, from the perspective of the processor device at any particular time. With this information, many types of errors in the software and/or hardware relating to the processor device being debugged can be identified and subsequently corrected.

Tracing functions are typically accomplished in conventional processor devices by a debug support circuit which is connected to a system bus that connects the processor device to external memory and/or other peripheral devices. Addresses, instructions and data regarding the functions of the processor device being debugged can often by viewed from monitoring the system bus.

In advanced breakpointing techniques, the program can proceed until the particular breakpoint condition has been reached a certain number of times. Other techniques look for particular data patterns on a data bus instead of looking for a particular line of code (or address) in memory. In any event, a particular scenario is established within the processing device for defining a breakpoint.

Oftentimes, monitoring the execution of individual lines of program code, e.g., using a trace function is intense and may require the review of many parameters at any particular line of program code. The engineer or programmer can typically step line-by-line through the program code, but as development proceeds this may become a time consuming and expensive task to reach an advanced point of interest in the program code. Therefore, a stopping point, or breakpoint is often set at a particular line of code, and the processing device is allowed to operate at normal (or high) speed until the program code executes an instruction satisfying the breakpoint criteria (e.g., reaching a particular address, accessing a particular peripheral or memory location, etc. At that point, the processor device will automatically halt.

The breakpoint or event that the engineer or programmer typically selects to halt operation of the processor device is commonly known as a debug exception. Typically, debug exceptions may be based on data and/or instruction breakpoints, wherein data breakpoints halt operation of the program when the processing device accesses a specified address in memory, and instruction breakpoints halt operation of the program when the processor device executes a specified instruction. In order to respond to the debug exception event, the processor device often executes a series of operations, entitled a debug exception service routine, in response to generation of the breakpoint. The debug exception service routine leads to a user interface for the engineer or programmer to explore the status of the processor device being debugged as preserved by the stoppage at the breakpoint. Peripherals and other devices may be halted by the processor when it receives a debug exception.

Figure 5:
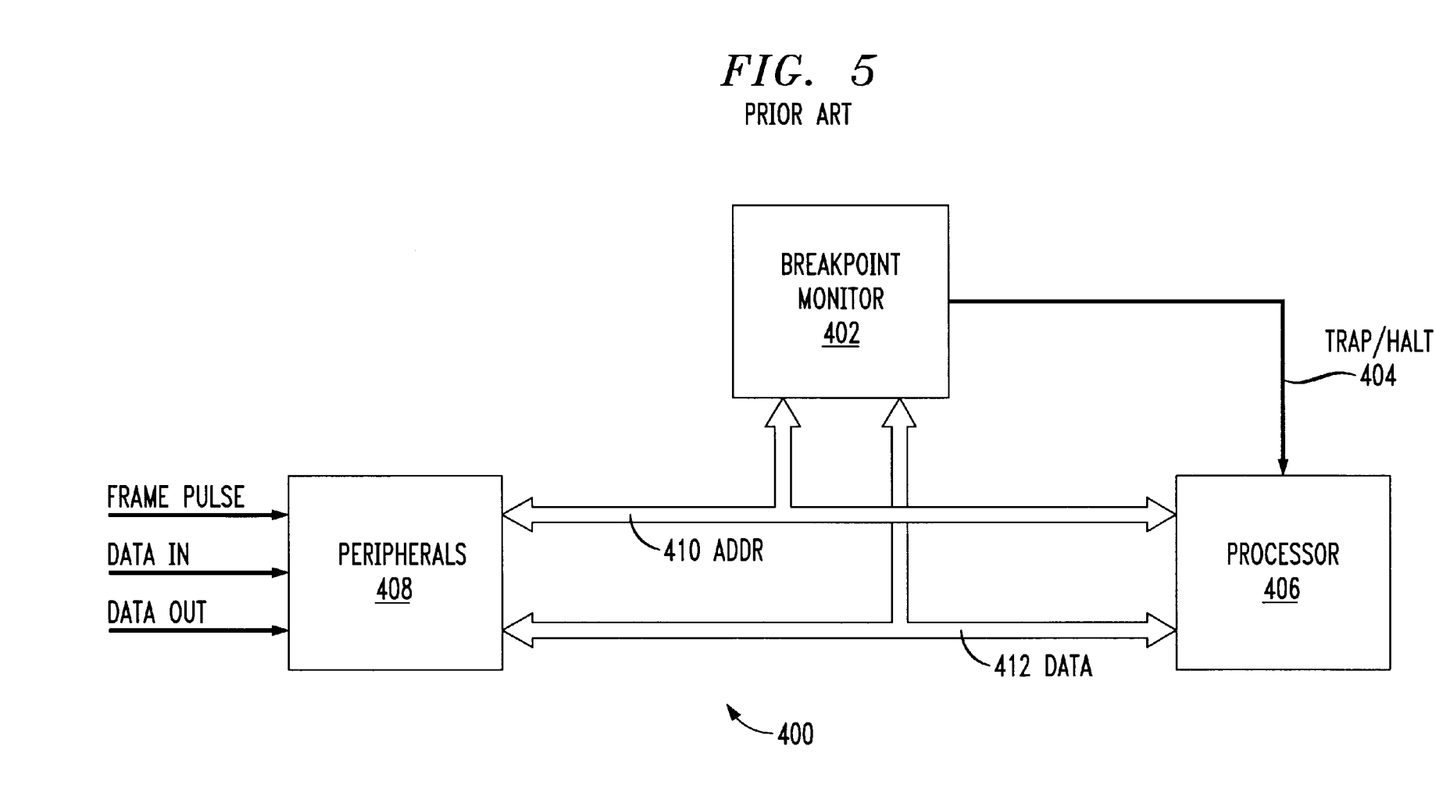
FIG. 5 shows a conventional system for monitoring the occurrence of a breakpoint event.

FIG. 5 shows a conventional system for monitoring the occurrence of a breakpoint event set within an emulator system by a processor device.

As illustrated in FIG. 5, an emulator system 400 for a processor 406 typically has a breakpoint or watchpoint monitor 402 monitoring the system bus, typically comprising a data bus 412 and an address bus 410.

When the breakpoint monitor 402 detects the occurrence of a breakpoint, the breakpoint monitor 402 will typically issue a trap/halt signal 404 to halt the normal flow of the processor 406. At this point, the emulated processor 406 may be operated line by line, forward or backward, etc., by the engineer or programmer using the breakpoint exception routine to locate a particular hardware or software bug related to the processor 406.

As useful as the breakpoint and tracing functions are, the debugging process may become more difficult as the number of devices increases in a digital system. For instance, a digital system may have many processor devices (e.g., microprocessors, digital signal processors (DSPs), microcontrollers, programmable logic devices, etc.) therein communicatively operating with one another. Moreover, many digital systems include one or more processing device which operate on information asynchronously, obtained from another device, e.g., a coder/decoder (CODEC) operating on a fixed data frame basis.

The debugging process may become more complex and time intensive as the number of peripherals or non-processor devices in the digital system increases. Problems or bugs occurring with respect to a peripheral device must be typically inferred from an inspection of a processor device or memory system when halted due to a particular breakpoint due to the processor and not the peripheral. Oftentimes, a developer must go back and forth in their tracing from one processor device to the next processor device, or between processor device and a peripheral device halting one with a suitable emulation device and inspecting from the perspective of the halted device. Accordingly, back and forth testing and debugging of individual devices may not provide a complete understanding of the full digital system at the time when the relevant device is halted. Testing and debugging becomes a problem of not only testing and debugging individual components but of testing and debugging the interaction of a plurality of devices working together in a digital system.

There is a need for a breakpointing technique which allows a more accurate evaluation of a plurality of separate devices at a desired instant in time.

SUMMARY OF THE INVENTION

In accordance with the principles of the present invention, a device is disclosed to initiate and then synchronize a breakpoint from a peripheral to a processor. The device comprises a peripheral generating a breakpoint signal dependent on a user defined event for the peripheral. The device further comprises circuitry to process the breakpoint signal, independent of information passed on the busses associated with a processor, to activate a halt input of the processor.

A method for synchronizing a breakpoint is disclosed. The method comprises generating a breakpoint signal in a peripheral where the breakpoint signal is generated by a user defined event. After the breakpoint signal is generated, processing the breakpoint signal by circuitry to activate a halt input of a processor where the processing is independent of information passed on busses associated with the processor.

In accordance to the principles of the present invention, another embodiment of the present invention an apparatus for synchronizing a breakpoint is disclosed. The apparatus comprises a peripheral generating a breakpoint signal dependent on a user defined event for the peripheral. The apparatus further comprises a hardware development block associated with testing and debugging of a processor where the hardware development block processes the breakpoint signal to activate a halt input of the processor independent of information passed on busses associated with the processor.

A method for synchronizing a breakpoint is disclosed. The method comprises generating a breakpoint signal in a peripheral capable of being dependent on a user defined event for the peripheral. Subsequent to the generation of the breakpoint signal, processing said breakpoint signal to activate a halt input of a processor independent of information passed on busses associated with the processor by a hardware development block associated with testing and debugging of the processor.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides the ability to halt a plurality of separate devices based on the occurrence of a breakpoint with respect to only one of the plurality of devices. In particular, a breakpoint may be set in a peripheral device separate from the processor device, and the processor device can be halted as if the breakpoint occurred within the processor device. Accordingly, a processor device can be halted based on the occurrence of a breakpoint reached in a peripheral device.

The peripheral device may be, e.g., an audio CODEC or other asynchronous, serial stream, frame based data device, another processor device, etc.

Figure 1:
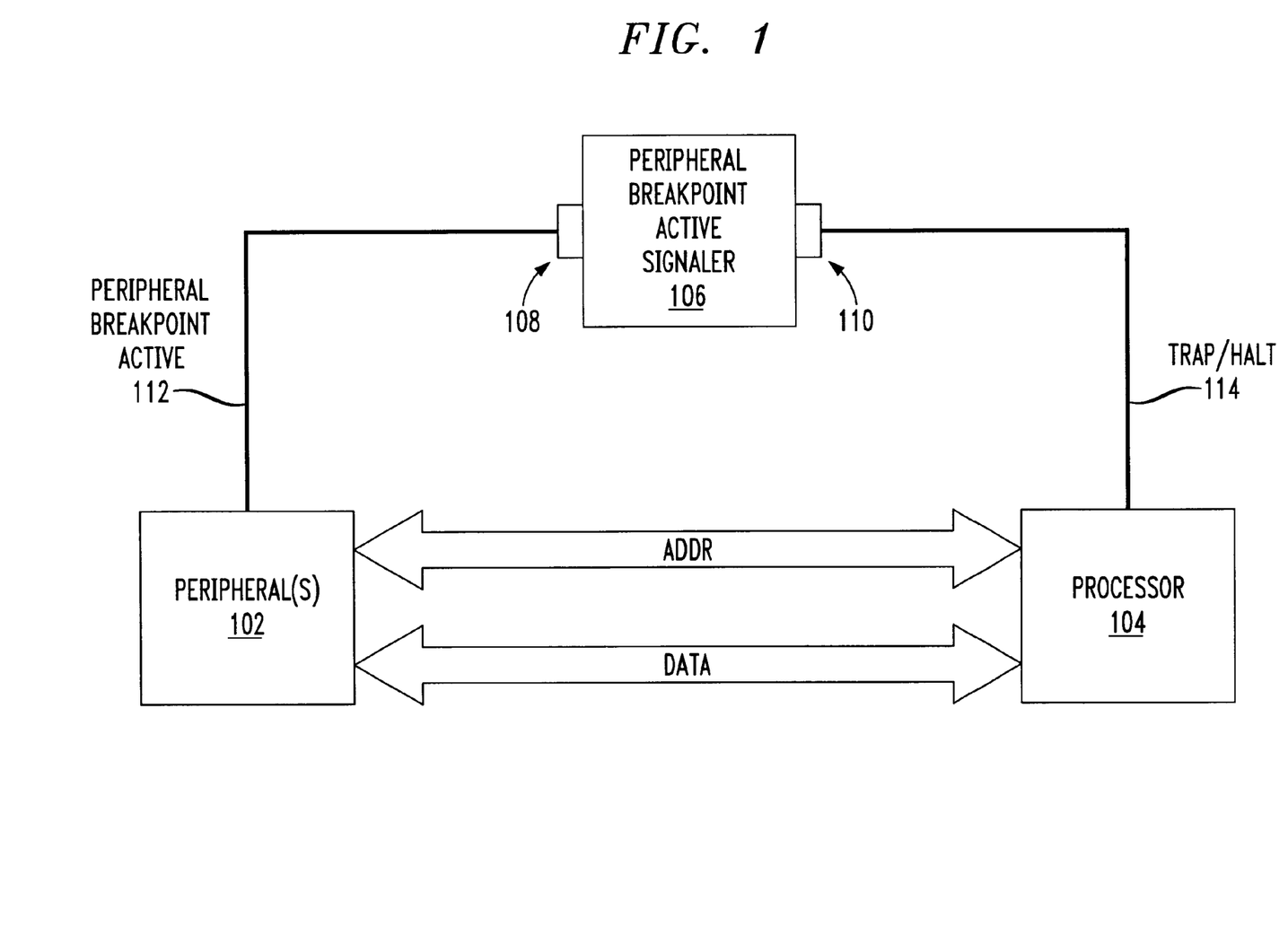
FIG. 1 shows the general architecture of an exemplary embodiment of a peripheral breakpoint active signaler in accordance with the principles of the present invention.

FIG. 1 illustrates the general architecture of an exemplary peripheral breakpoint active signaler in accordance with the principles of the present invention.

The principles of the present invention further the prior techniques by allowing one or more peripherals 102 to signal a processor 104 of the occurrence of a breakpoint through a peripheral breakpoint active signaler 106 without the use of the address, data, or I/O busses which may not relate to the basis for the breakpoint.

For instance, a breakpoint may be desired in a peripheral device such as a CODEC based on the end of, e. g., the $25^{th}$ frame of data passed through. Such framing information, such as the timing of the frame, is not usually available by monitoring the address, data and/or I/O busses of the processor. Accordingly, the peripheral device can operate in real time until the desired stoppage point associated with a breakpoint set in the peripheral, and the peripheral active signaler 106 can cause simultaneous stoppage of the processor 104 using an appropriate trap/halt line 114 into the processor 104.

The peripheral breakpoint active signaler 106 is preferably a separate unit from the processor 104 and the peripherals 102 but of course can be integrated with either the processor 104 or a peripheral 102 in accordance with the principles of the present invention.

The peripheral breakpoint active signaler 106 includes an appropriate peripheral interface 108 and an appropriate processor interface 110. The peripheral interface 108 receives a peripheral breakpoint active signal 112 from a relevant peripheral 102, and the processor interface 110 signals or notifies the processor 104 of the breakpoint using its trap/halt line 114.

The processor 104 can be implemented by a microprocessor or central processing unit (CPU), but may also or instead include a device such as a digital signal processor (DSP), a microcontroller, or any other suitable device that has debugging or on-board emulation capability.

The peripheral 102 may be any device that can be attached to the processor 104 including, but not limited to, a CODEC, an I/O port, a synchronous serial interface (SSI), another processor, etc.

When at least one of the peripherals 102 reaches a user defined breakpoint set in the relevant peripheral 102 that peripheral 102 outputs a signal to the peripheral breakpoint active signaler 106 indicating that a breakpoint has occurred in one of the peripheral devices 102. Once the peripheral breakpoint active signaler 106 receives indication that a peripheral has reached a breakpoint, the peripheral breakpoint active signaler 106 substantially simultaneous halts the processor 104 through the processor interface 110. Subsequent to receiving the notification of a breakpoint in a peripheral 102, the processor 104 allows conventional debugging and emulation conventionally carried out in a debugging process.

The event which triggers a breakpoint signal in the processor 104 is dependent on the peripheral. For example, a CODEC may trigger on the end of a conversion frame, an SSI may trigger at the end of a data transfer, or an I/O port may trigger whenever there is a change in the state of an input pin. In this way, the developer may verify that their code is functioning properly or as desired relative to both the processor and its peripherals.

The present invention allows synchronization of a processor halt with the activation of a breakpoint in a peripheral device as opposed to merely monitoring the address, data, or I/O busses of the processor (or of the peripheral device) as with conventional systems. Thus, the peripheral breakpoints may be determined outside of the address, data, or I/O busses of the processor.

Figure 2:
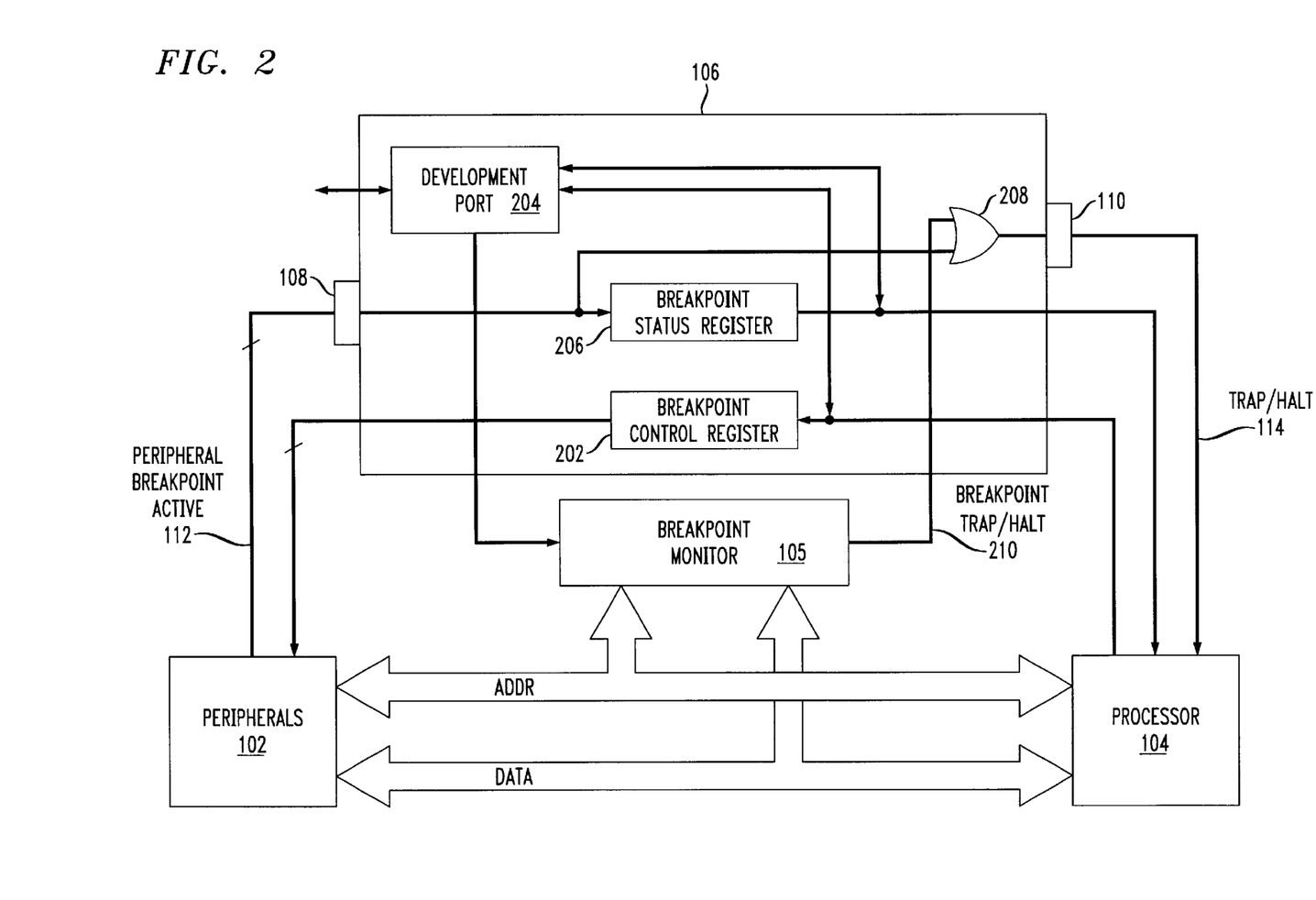
FIG. 2 depicts in more detail the architecture of the peripheral breakpoint active signaler shown in FIG. 1.

FIG. 2 is a more detailed illustration of the architecture of the peripheral breakpoint active signaler 106 shown in FIG. 1.

In particular, the breakpoint active signaler 106 interfaces with a conventional system comprising of a processor 104 and one or more peripherals 102. An otherwise conventional breakpoint monitor 105 may also be included to allow conventional breakpointing from the perspective of the address, data and/or I/O-busses.

The disclosed breakpoint active signaler 106 includes a breakpoint control register 202 to set parameters and a breakpoint status register 206 to allow monitoring of parameters.

The breakpoint control register 202 controls which peripheral(s) 102 can activate a breakpoint. In this particular embodiment, one register bit is assigned to each peripheral which will have the capability of breakpointing. On reset, the bits in the control register 202 are reset to disable the breakpointing capability of all peripherals 102. The breakpoint control register 202 is also preferably interfaced to the processor 104.

In this particular embodiment, the breakpoint control register 202 may be connected to the processor 104 through any input/output port or a pin of the processor 104. This would allow the programmer or engineer the ability to enable a particular peripheral's breakpoint capability by allowing the setting and resetting of the bits in the breakpoint control register 202 from the processor 104. Alternatively, the breakpoint control register 202 may be set and reset by directly by the programmer or engineer through another interface other than through the processor 104.

The breakpoint control register 202 may also be set and reset by a development port 204 as illustrated in FIG. 2. The development port 204 in this particular embodiment is a test interface which allows access to a breakpoint monitor 105 of the processor 104. However, the development port 204 need not necessarily be connected to the breakpoint monitor 105 of a particular processor. For instance, the development port 204 may be directly connected to a trap/halt or similar function pin of the processor 104.

In the event of multiple peripheral breakpoints occurring simultaneously, it might be difficult to determine which of a larger number of peripherals reached their respective breakpoint. In order to assist in the determination of which peripheral activated the peripheral breakpoint active signal 112, a breakpoint status register 206 is used. The breakpoint status register 206 may also be interfaced with breakpoint active signals 112 from each of the peripherals 102, with, e.g., one register bit being assigned to each peripheral device 102.

The breakpoint status register 206 is preferably accessible when the processor 104 is in a debug state. After entering the debug state, the halted peripheral; 102 is stopped together with the processor 104, allowing the programmer or engineer to access the breakpoint status register 206 through the processor 104 or through the development port 204 to determine which of the peripheral 102 caused the breakpoint to occur.

The peripheral breakpoint active signals 112 may also be gated together with a breakpoint trap/halt signal 210 from an otherwise conventional breakpoint monitor 105 using an appropriate OR gate 208 or similar logic. If the processor 104 is not equipped with an otherwise conventional breakpoint monitor 105, the peripheral breakpoint active signals 112 may be gated together with OR gate 208.

In the particular embodiment of FIG. 2, the output of the OR gate 208 is then passed to the processor 104 as a TRAP/HALT signal 114 to immediately halt the processor 104.

In operation, the programmer or engineer will set the breakpoint control register 202 to enable breakpoint capability in one or more of the peripherals 102, and the application program which is being debugged is executed on the processor 104. When the predetermined event which triggers a peripheral 102 to breakpoint is reached, the respective breakpoint active signal 112 is activated, causing a bit in the breakpoint status register 206 to be set and activate the output of the OR gate 208. The output of the OR gate 208 becomes the TRAP/HALT signal 114 which notifies the processor 104 of a breakpoint to thus halt the processor.104.

Figure 3:
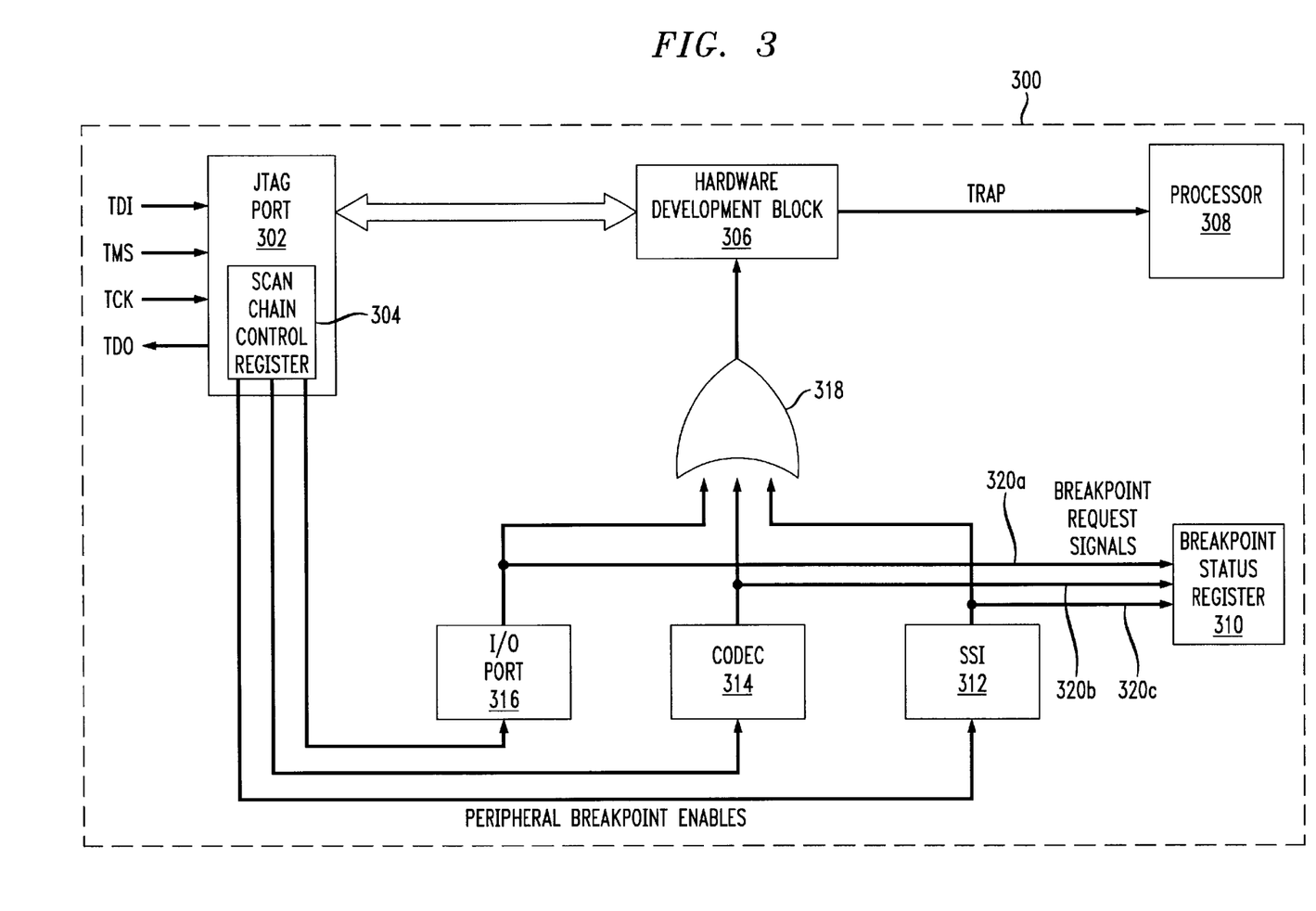
FIG. 3 shows the architecture of another embodiment of peripheral breakpoint active signaler with a JTAG port in accordance with the principles of the present invention.

FIG. 3 shows the architecture of another embodiment of a peripheral breakpoint active signaler including a JTAG port constructed in accordance with the principles of the present invention.

As with conventional systems, this embodiment includes a processor 308. However, a hardware development block 306 is included to control the breakpoint signaling of a peripheral to the trap/halt signal of the processor 308, and a JTAG or other serial interface test port 304. The JTAG port 302 is a standardized test interface used to assist software programmers and/or engineers in the initial design and development of hardware device.

In particular, the hardware development block 306 includes logic circuitry to allow the testing and debugging of the processor 308, e.g., on-board simulation and/or built-in test algorithms.

In operation, a programmer or engineer accesses the hardware development block 306 through the JTAG port 302.

The JTAG port 302 includes a scan chain control register 304 to allow communication with more than one peripheral device. A signal to enable breakpointing from any peripheral associated with the JTAG port is stored in a register bit in the scan chain control register 304.

The scan chain control register 304 is accessed by external devices through the JTAG port 302. In the disclosed embodiment, one bit in the scan chain control register 304 is assigned to each peripheral device which has the capability of breakpointing. Preferably, at reset, the bits its in the scan chain control register 304 are reset to disable the breakpointing capability of all associated peripheral devices until enabled by an initialization or other routine.

When the programmer or engineer has set the appropriate bit in the scan chain control register 304 to enable peripheral breakpointing for a particular peripheral device, the relevant circuitry generates a breakpoint request signal 320 from the enabled peripherals 312, 314, or 316 as shown in FIG. 3.

The breakpoint request signals 320 are logically OR'ed, and input to the hardware development block 306. The programmer sets the bits while the processor 308 is in a debug state.

The breakpoint request signals 320 from the peripherals 312, 314, 316, are gated together with, an OR gate 318 and sent to the hardware development block 306, which synchronizes the breakpoint request and trap/halt signal to the processor 308. Thus, the peripheral breakpoints are applied to the processor 308 and halt the processor 308 as if they were caused by a breakpoint set in the processor 308. In the event of multiple peripheral breakpoints occurring simultaneously, the relevant breakpoint request signals can be used to set appropriate bits in a breakpoint status register 310. After entering the debug state, the programmer or engineer can upload the breakpoint status register to the JTAG port or to the processor 308 to determine which peripherals caused the breakpoint to occur.

In a debug exception caused by a peripheral breakpoint, the breakpoint event can be examined in relation to the processor's current state. This allows the engineer or programmer to debug timing problems in their code due to the interaction of different peripherals with the processor.

Figure 4:
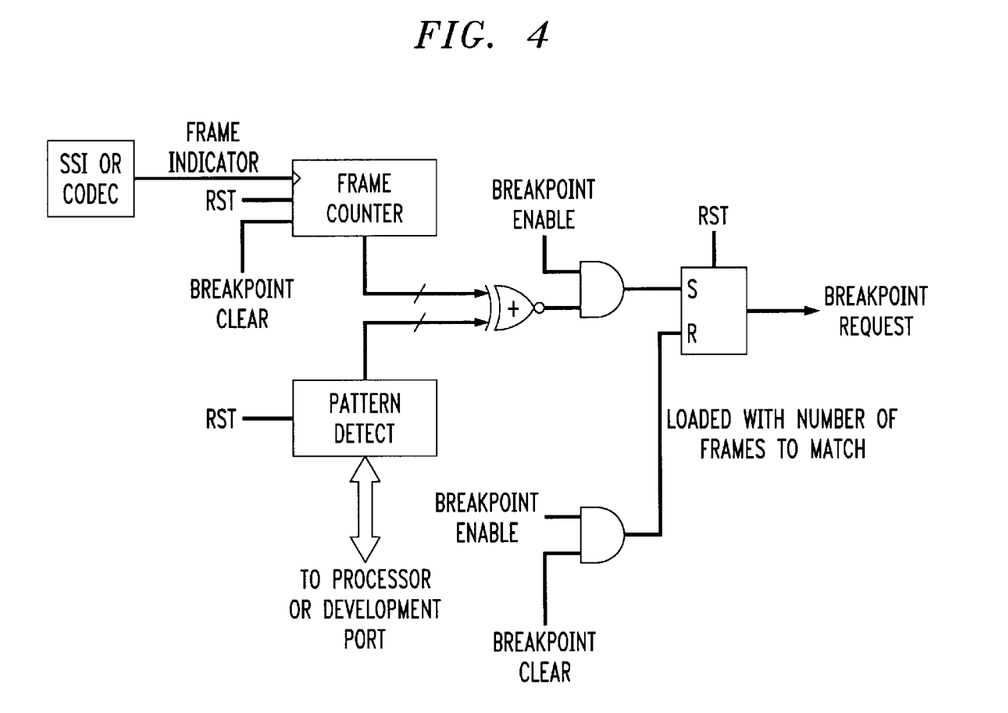
FIG. 4 shows exemplary circuitry to clear a particular breakpoint caused by a peripheral.

FIG. 4 shows exemplary circuitry to clear a particular breakpoint caused by a peripheral.

In particular, before exiting the debug state, the processor preferably clears the event in the peripheral which caused the peripheral breakpoint. Additionally, the processor preferably re-initializes the triggering circuits in the peripherals which caused the breakpoint events.

The processor or development port could configure a different breakpoint event to occur. For example, if the peripheral breakpoint event occurs when a certain number of frames have occurred with the codec 314 or SSI 312, the frame counter would be reset as would be the breakpoint latch.

A breakpoint clear signal can be a pulse generated from a trap acknowledge signal sent by the processor after the device enters a debug state. Alternatively, the breakpoint clear signal can be formed by a pulse generated after the processor writes to a specific bit, or by the JTAG port.

After exiting the debug state, the processor 308 is allowed to resume normal operation, as are the peripherals which were enabled to breakpoint. If the peripheral 312, 314, 316 detects a predetermined event, it generates the breakpoint request signal 320.

The event which triggers the output of a breakpoint request signal from any of the peripherals 312, 314, 316 to the processor 308 is dependent on the peripherals 312, 314, 316 themselves. For example, a CODEC 314 may trigger on the end of a conversion frame, an SSI 312 may trigger at the end of a data transfer, or an I/O port 316 may trigger whenever there is a change in the state of an input pin. In this way, the programmer or engineer may verify that their code is functioning properly.

While the invention has been described with reference to the exemplary embodiments thereof, those skilled in the art will be able to make various modifications to the described embodiments of the invention without departing from the true spirit and scope of the invention.

What is claimed is:

1. A device to initiate and then synchronize a breakpoint from a peripheral to a processor, said device comprising:
   a peripheral generating a breakpoint signal based on a user defined event for said peripheral; and
   a circuit to process said breakpoint signal, independent of information passed on busses associated with a processor, to activate a halt input of said processor, said circuit comprising a control register adapted to enable said peripheral generating said breakpoint signal.

2. The device to initiate and then synchronize a breakpoint from a peripheral to a processor according to claim 1, wherein:
   said control register enables said peripheral by setting a register bit assigned to said peripheral.

3. The device to initiate and then synchronize a breakpoint from a peripheral to a processor according to claim 1, wherein:
   said control register is programmable by one of said processor and a development port.

4. The device to initiate and then synchronize a breakpoint from a peripheral to a processor according to claim 1, wherein said circuit further comprises:
   a status register adapted to monitor said peripheral generating said breakpoint signal.

5. The device to initiate and then synchronize a breakpoint from a peripheral to a processor according to claim 4, wherein:
   said status register provides data to one of said processor and a development port.

6. The device to initiate and then synchronize a breakpoint from a peripheral to a processor according to claim 4 wherein:
   said status register monitors said peripheral by assigning a register bit to said peripheral.

7. The device to initiate and then synchronize a breakpoint from a peripheral to a processor according to claim 1, wherein said circuit further comprises:
   an OR gate, an output of said OR gate interfacing to said halt input of said processor, and inputs to said OR gate are based on said breakpoint signal and a breakpoint halt signal from a breakpoint monitor associated with said processor.

8. A method for synchronizing a breakpoint, said method comprising:
   generating a breakpoint signal in a peripheral based on a user defined event;
   activating a halt input of a processor associated with said peripheral, said activation being independent of information passed on busses associated with said processor; and
   controlling said peripheral generating said breakpoint signal using a control register.

9. The method according to claim 8, said method further comprising:
   assigning a register bit in said control register to said peripheral.

10. The method according to claim 8, said method further comprising:
    programming said control register from one of said processor and a development port.

11. The method according to claim 8, said method further comprising:
    monitoring said peripheral generating said breakpoint signal with a status register.

12. The method according to claim 11, said method further comprising:
    interfacing said status register with one of said processor and a development port.

13. The method according to claim 11, said method further comprising:
    assigning a register bit in said status register to said peripheral.

14. The method according to claim 8, said method further comprising:

interfacing an output of an OR gate to said halt input of said processor, said OR gate having inputs corresponding to said breakpoint signal and a breakpoint halt signal from a breakpoint monitor associated with said processor.

15. An apparatus for synchronizing a breakpoint, said apparatus comprising:

a peripheral generating a breakpoint signal dependent on a user defined event for said peripheral; and a hardware development block associated with testing and debugging of a processor wherein said hardware development block processes said breakpoint signal to activate a halt input of said processor independent of information passed on busses associated with said processor, said hardware development block interfacing with a serial test port including a JTAG port.

16. The apparatus according to claim 15, wherein:

said serial test port includes a scan chain control register adapted to enable said peripheral generating said breakpoint signal.

17. The apparatus according to claim 16, wherein:

said scan control register enables said peripheral by setting a register bit assigned to said peripheral.

18. The apparatus according to claim 15, further comprising:

a status register adapted to monitor said peripheral generating said breakpoint signal.

19. The apparatus according to claim 18, wherein:

said status register interfaces to one of said processor and a serial test port.

* * * * *